United States Patent [19]
Botich

[11] Patent Number: 5,429,665
[45] Date of Patent: Jul. 4, 1995

[54] APPARATUS FOR INTRODUCING MICROWAVE ENERGY TO DESICCANT FOR REGENERATING THE SAME AND METHOD FOR USING THE SAME

[76] Inventor: Leon A. Botich, 10125 E. Tanglewood Cir., Palos Park, Ill. 60464

[21] Appl. No.: 144,877

[22] Filed: Oct. 27, 1993

[51] Int. Cl.⁶ .............................................. B01D 53/04
[52] U.S. Cl. .............................. 95/99; 95/105; 95/122; 95/126; 96/126; 96/144; 219/687; 219/748
[58] Field of Search ........ 34/259; 95/98, 99, 104–106, 95/117, 123, 126; 96/126–128, 130, 133, 143, 144; 219/687, 690, 748; 343/853

[56] References Cited

U.S. PATENT DOCUMENTS

| | | | |
|---|---|---|---|
| 3,668,358 | 6/1972 | Stenstrom | 219/687 |
| 4,026,680 | 5/1977 | Collins | 96/126 X |
| 4,094,652 | 6/1978 | Lowther | 96/143 |
| 4,221,948 | 9/1980 | Jean | 219/748 |
| 4,312,640 | 1/1982 | Verrando | 95/105 |
| 4,312,641 | 1/1982 | Verrando et al. | 95/105 |
| 4,322,394 | 3/1982 | Mezey et al. | 95/148 X |
| 4,339,648 | 7/1982 | Jean | 219/748 X |
| 4,571,473 | 2/1986 | Wyslouzil et al. | 219/748 X |
| 4,967,486 | 11/1990 | Doelling | 34/259 |
| 5,182,426 | 1/1993 | Sklenak et al. | 219/690 |
| 5,187,131 | 2/1993 | Tiggelbeck et al. | 95/104 X |
| 5,191,721 | 3/1993 | Incorvia et al. | 34/259 |
| 5,268,022 | 12/1993 | Garrett et al. | 95/98 |
| 5,308,944 | 5/1994 | Stone-Elander et al. | 219/687 |

FOREIGN PATENT DOCUMENTS

| | | | |
|---|---|---|---|
| 2849777 | 9/1979 | Germany | 219/748 |

*Primary Examiner*—Robert Spitzer
*Attorney, Agent, or Firm*—Potthast & Ring

[57] ABSTRACT

A gas drying device (30) in which wet gas (31) is introduced into a chamber (36) containing desiccant (38) in which the desiccant (38) adsorbs moisture from the wet gas (31) to dry the wet gas (31) and in which energy is utilized to energize and to remove the moisture from the desiccant (38) to dry and to regenerate the desiccant (38) for reuse to dry wet gas (31) includes a microwave generator (52) and an antenna member (48) in communication with microwaves (50) generated by the microwave generator (52) in which at least a portion of the antenna (48) is disposed within the chamber (46). Also included is a method for drying wet gas (31) in which wet gas (31) is introduced into a chamber (46) containing desiccant (38) in which the desiccant (38) adsorbs moisture from the wet gas (31) in drying the wet gas (31) and microwave energy is applied to the adsorbed moisture to remove the moisture from the desiccant (38) to regenerate the desiccant (38) for reuse in drying wet gas (31) which includes the steps of placing an antenna member (48) into communication with microwaves (50) generated by a microwave generator (52) and disposing at least a portion of the antenna member (48) into the chamber (46) containing the desiccant (38).

39 Claims, 9 Drawing Sheets

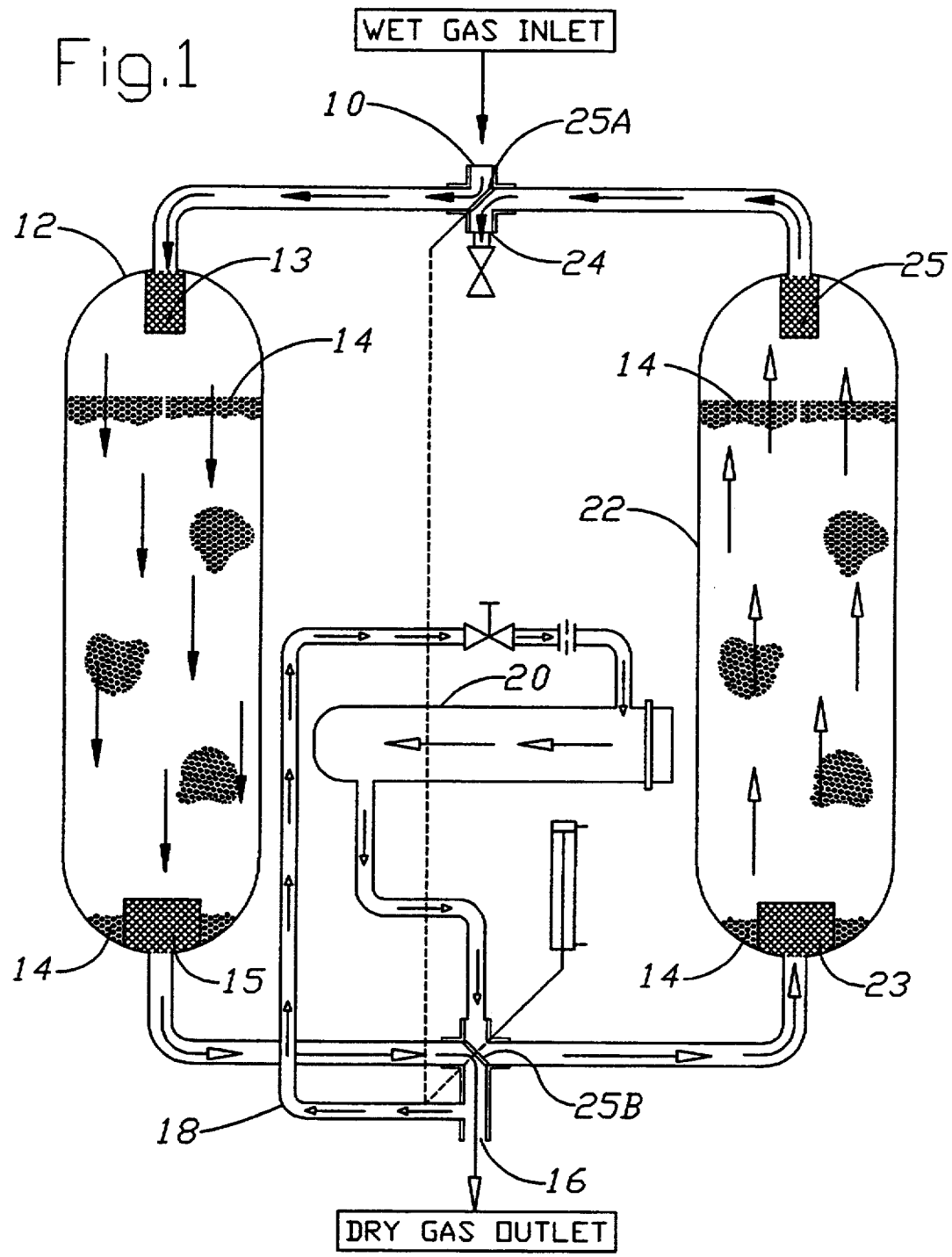

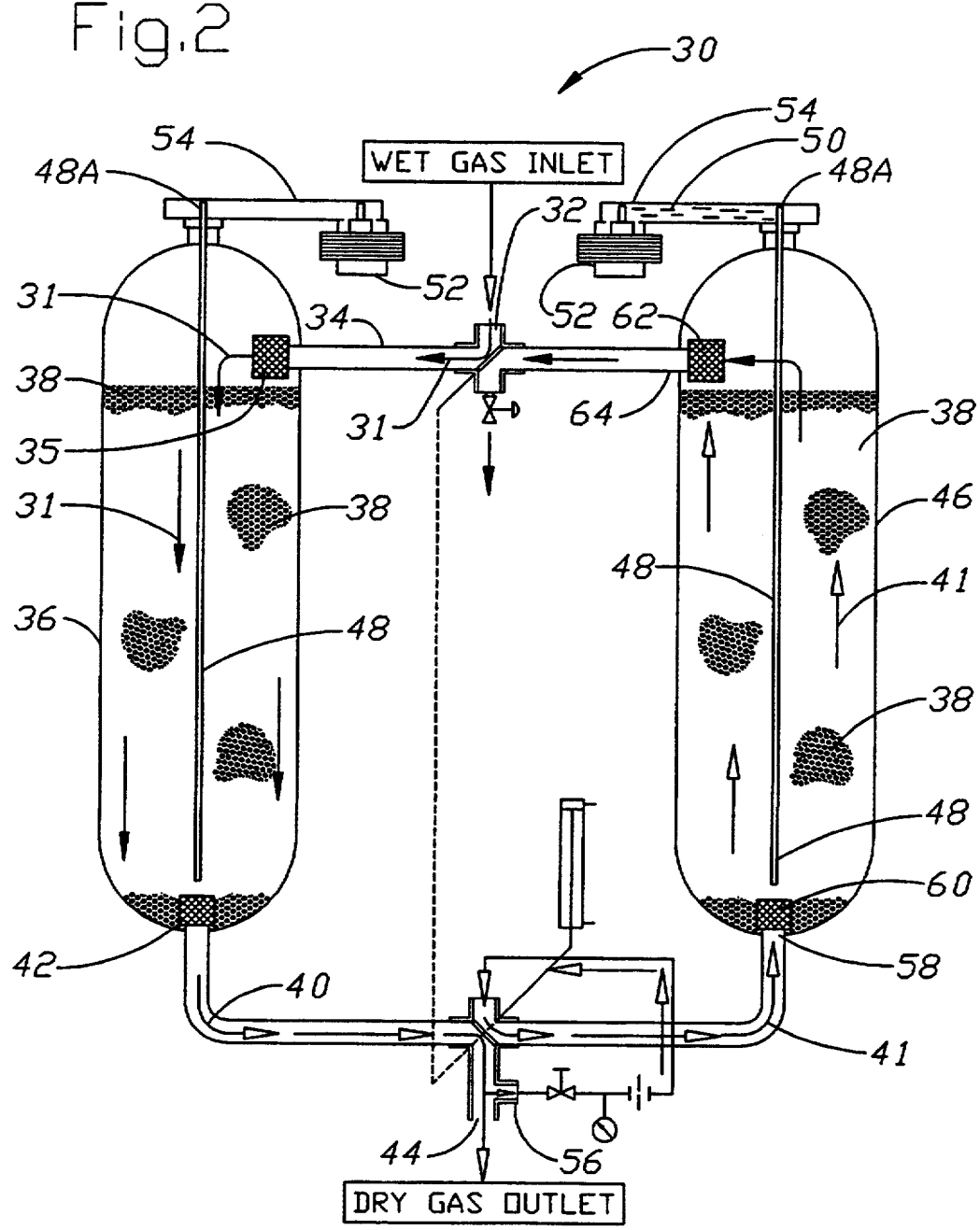

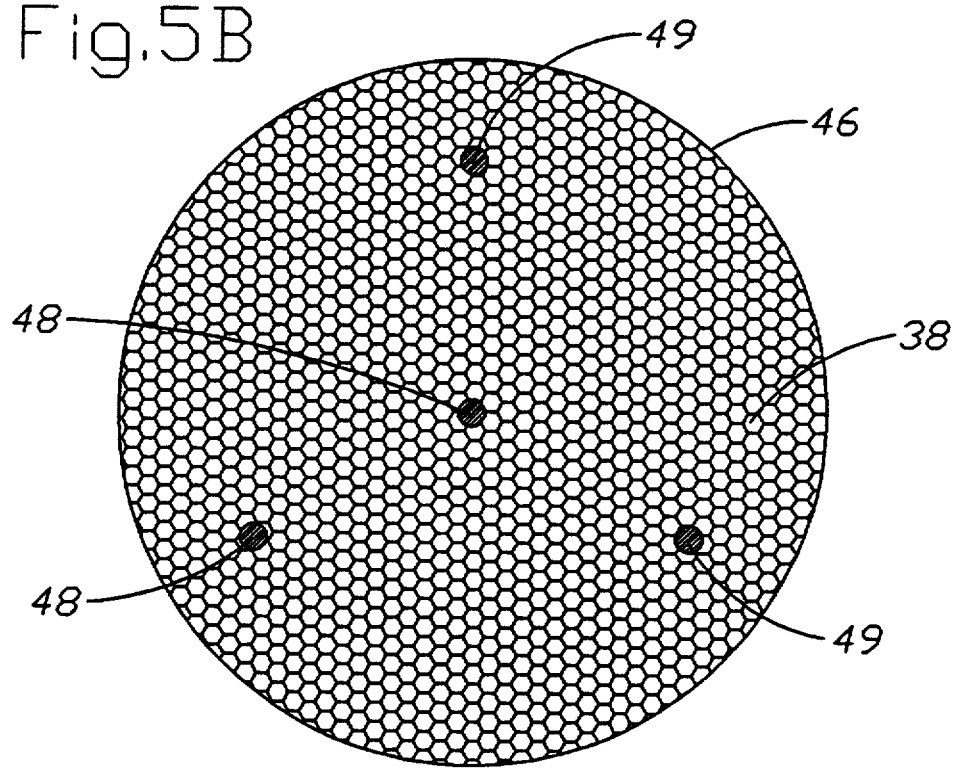
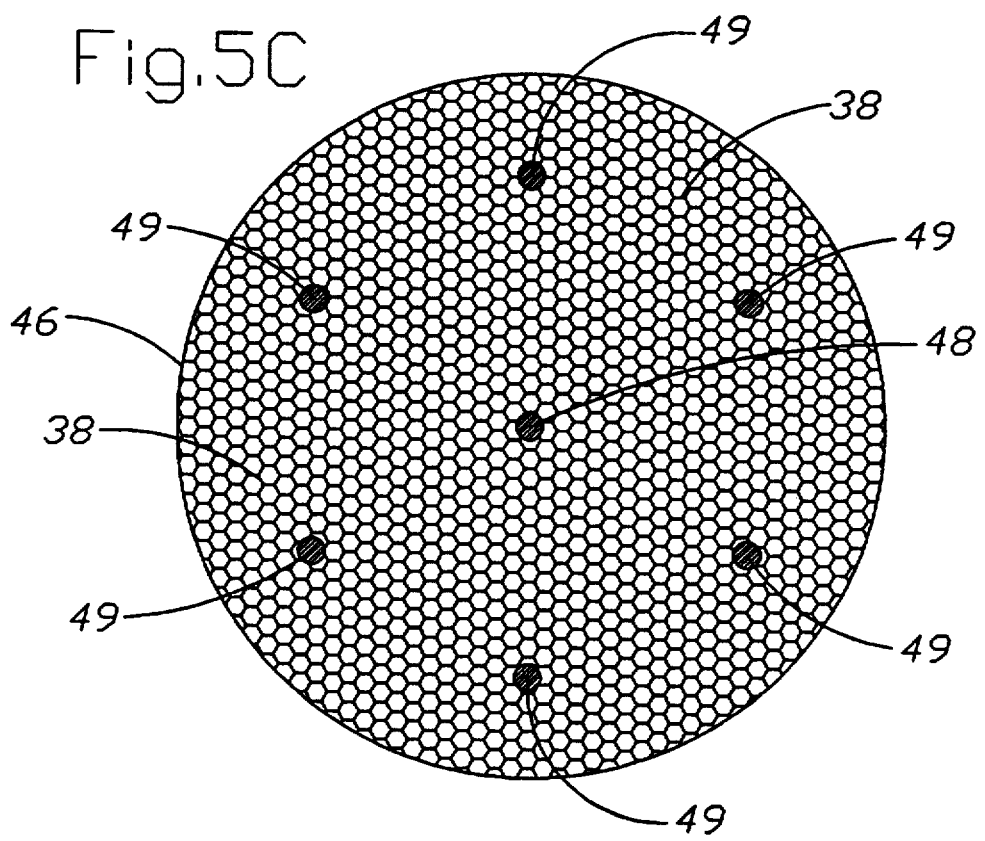

Fig.6A

| TIME | TEMPERATURE DEG. FARENHEIGHT | | | |
|---|---|---|---|---|
| | TOP | CENTER | BOTTOM | DISCHARGE |
| 1:00 | 75 | 75 | 75 | 75 |
| 1:02 | 85 | 79 | 76 | 78 |
| 1:04 | 98 | 80 | 79 | 82 |
| 1:06 | 105 | 82 | 80 | 98 |
| 1:08 | 110 | 85 | 82 | 104 |
| 1:10 | 115 | 88 | 85 | 115 |
| 1:12 | 117 | 90 | 85 | 115 |
| 1:14 | 120 | 94 | 85 | 118 |
| 1:16 | 120 | 95 | 85 | 120 |
| 1:18 | 124 | 98 | 88 | 120 |
| 1:20 | 125 | 98 | 88 | 121 |
| 1:22 | 125 | 99 | 90 | 121 |
| 1:24 | 125 | 99 | 90 | 120 |
| 1:26 | 126 | 100 | 90 | 120 |
| 1:28 | 127 | 100 | 90 | 120 |
| 1:30 | 128 | 100 | 90 | 122 |
| 1:45 | 135 | 105 | 95 | 124 |
| 2:00 | 140 | 108 | 100 | 132 |
| 2:15 | 150 | 115 | 100 | 136 |
| 2:30 | 155 | 120 | 105 | 140 |
| 3:00 | 166 | 131 | 111 | 145 |
| 3:30 | 190 | 150 | 143 | 152 |
| 4:00 | 240 | 192 | 155 | 160 |
| 4:30 | 300 | 230 | 200 | 177 |
| 5:00 | 370 | 280 | 235 | 194 |

Fig. 7A

| TIME | TEMPERATURE DEG. FARENHEIGHT | | | |
|---|---|---|---|---|
| | TOP | CENTER | BOTTOM | DISCHARGE |
| 1:00 | 75 | 75 | 75 | 75 |
| 1:02 | 100 | 77 | 75 | 77 |
| 1:04 | 122 | 80 | 75 | 86 |
| 1:06 | 135 | 85 | 76 | 95 |
| 1:08 | 150 | 89 | 78 | 101 |
| 1:10 | 160 | 92 | 80 | 105 |
| 1:12 | 168 | 95 | 82 | 108 |
| 1:14 | 175 | 100 | 84 | 111 |
| 1:16 | 181 | 103 | 85 | 114 |
| 1:18 | 187 | 107 | 87 | 117 |
| 1:20 | 192 | 110 | 88 | 121 |
| 1:22 | 198 | 115 | 90 | 125 |
| 1:24 | 203 | 117 | 92 | 124 |
| 1:26 | 205 | 119 | 93 | 125 |
| 1:28 | 210 | 122 | 95 | 128 |
| 1:30 | 213 | 124 | 95 | 130 |
| 1:45 | 232 | 135 | 100 | 138 |
| 2:00 | 255 | 148 | 105 | 148 |
| 2:15 | 275 | 157 | 110 | 159 |
| 2:30 | 290 | 161 | 115 | 161 |
| 3:00 | 315 | 184 | 132 | 175 |
| 3:30 | 375 | 209 | 136 | 181 |
| 4:00 | 403 | 226 | 142 | 190 |
| 4:30 | 442 | 255 | 155 | 199 |
| 5:00 | 453 | 270 | 162 | 210 |

APPARATUS FOR INTRODUCING MICROWAVE ENERGY TO DESICCANT FOR REGENERATING THE SAME AND METHOD FOR USING THE SAME

BACKGROUND OF THE INVENTION

1. Field of the Invention

This invention relates generally to the field of gas or air drying devices and more particularly to regenerative gas or air drying devices which utilize desiccant to dry air or other gases in a chamber in one portion of the device in which wet air or gas is passed through the desiccant contained in such chamber and the moisture is adsorbed by the desiccant and in another portion of the device microwaves are dispersed through another chamber containing saturated desiccant, which had become saturated in previously drying wet air or gas, to increase the temperature of the moisture that was adsorbed by the desiccant to enhance the drying of the desiccant for reuse to again dry wet air or gas.

2. Description of the Related Art Including Information Disclosed Under 37 CFR §§1.97-1.99

Drying devices receiving a gas under pressure such as air containing a high level of moisture are well known. These gas drying devices are commonly used in many industrial applications such as painting, pneumatic control systems and air operated equipment. It is also known in such devices to utilize a desiccant such as activated alumina, carbons, silica gels or molecular sieves located in a chamber to adsorb and remove the moisture from the inlet wet air or gas that is under pressure. Such air drying devices frequently use a portion of the dried air or purge gas from one desiccant chamber that is drying air to regenerate the desiccant in another chamber that has already removed moisture from the wet air in a previous cycle. The portion of dried air or purge gas is often diverted to a heater to elevate the temperature of the purge gas. Thereafter, the heated purge gas is moved to the other desiccant chamber to dry out and regenerate the saturated desiccant located therein.

Referring to FIG. 1, a known regenerative gas drying device is shown receiving wet gas (shown as solid arrows) through inlet 10. The wet gas enters a chamber 12 through screen 13 which is filled with desiccant 14. As the wet gas migrates through chamber 12, moisture in the gas is adsorbed by desiccant 14 thereby drying the gas. The dried gas (shown as hollow arrows) exits chamber 12 through screen 15 and is carried to gas outlet 16, at which, the dried gas leaves the drying device. However, not all of the dried gas exits the device for use. A small portion of the gas or commonly called purge gas is diverted into transport pipe 18 and is carried to heater 20.

The purge gas is heated at heater 20 and subsequently, is transported to another chamber 22 and enters chamber 22 through screen 23. Chamber 22 is filled with desiccant as in the first chamber 12, however, desiccant 14 in chamber 22 is saturated with moisture from a previous air drying cycle. The heated purge gas dries saturated desiccant 14 in chamber 22. The high moisture air from the drying of desiccant 14 in chamber 22 is removed from chamber 22 through screen 25 and exits the air drying device at exit valve 24.

Once desiccant 14 in chamber 12 is saturated from an air drying cycle and desiccant 14 in chamber 22 is dried out, the cycle is reversed by flipping diverter valves 25A and 25B. The wet gas is dried and heated upon passing through chamber 22 and heater 20. The dry and heated purge gas from chamber 22 is, in turn, used to dry the saturated desiccant of the first chamber 12. These known systems normally utilized approximately 7 percent of total dried air for the purge gas to regenerate desiccant. The regenerative gas drying device is cycled in this manner to continuously dry out the wet gasses.

Many problems arise in using these known systems. A large percentage of the dried air is utilized for purge which is needed to regenerate the desiccant. In addition, the purge is heated by heaters which utilize large quantities of energy and operate at very high temperatures. The high temperatures can precipitate further fire hazards particularly when such heaters are in close proximity to oil lubricated compressors used in conjunction with these systems to pressurize the desiccant chambers.

It is also known in gas drying systems to send microwave energy into pressurized tanks to heat gases adsorbed by desiccant materials located therein. In U.S. Pat. No. 4,312,640 to Verrando issued Jan. 26, 1982, and U.S. Pat. No. 4,312,641 to Verrando et al. issued Jan. 26, 1982, microwave energy is passed through microwave pressure windows and into tanks carrying sorbent or desiccant material. The microwaves are used to release and remove a polar gas adsorbed by sorbent or desiccant material in the tanks. The microwave energy is prevented from being sent into the tanks in response to the desorbtion of the moisture from the sorbent material. Purge gas is still moved through the desorbed desiccant until the moisture level of the chamber is adequately lowered.

In U.S. Pat. No. 4,322,394 to Mezey et al. issued Mar. 30, 1982, microwave energy is used to dielectrically heat saturated solids of noncarbon adsorbents for the removal of adsorbed materials. The microwaves heat the adsorbents internally to bring the adsorbents to a temperature for desorbing some of the adsorbate in the absence of any activating or purge gas.

Disadvantageously, in these known systems the distribution of the microwave energy within the pressurized tanks is limited. The microwave energy sent through pressure windows adjacent the tank enhances the ability of removal of the adsorbed material proximate to the pressure windows. However, since these known air drying systems do not provide a means for dispersing the microwaves throughout the tank, the material adsorbed by the desiccant located away from the pressure windows does not get sufficiently energized by the microwave to efficently desorb the adsorbate material. Thus, efficient desorbtion of wet gas is achieved more effectively at locations proximate to the pressurized windows while desiccant further away from the pressure windows does not receive as effective and beneficial microwave energy for desorbtion.

SUMMARY OF THE INVENTION

Accordingly, it is the principal object of the present invention to provide a desiccant regenerating device which utilizes microwave energy by effectively introducing and distributing the microwave energy within the desiccant chamber and to the moisture adsorbed by the desiccant.

Another object of this invention is to provide a microwave generator and an antenna member in communication with microwaves generated by the microwave generator in which a least a portion of the antenna is disposed within the chamber for holding desiccant.

Another object of this invention is to provide a method for drying wet gas which is dried by introducing the same into a chamber containing desiccant which adsorbs moisture from the wet gas and to subsequently dry or regenerate the desiccant by applying microwave energy to the adsorbed moisture of the desiccant to remove the same from the desiccant in order to regenerate the desiccant for reuse in drying wet gas by placing an antenna member into communication with microwaves generated by a microwave generator and disposing at least a portion of the antenna member into the chamber for holding the desiccant.

BRIEF DESCRIPTION OF THE DRAWINGS

The foregoing advantages, features and objects of the invention will be described in more detail and others will be made apparent from the detailed description of the preferred embodiments given below with reference to the several views of the drawing, in which:

FIG. 1 is a schematic view of the gas drying device of the prior art;

FIG. 2 is a schematic view of the gas drying device of the present invention;

FIG. 5B is a cross section view along line 5B—5B of FIG. 5A;

FIG. 5C is a cross section view of another embodiment along 5B—5B of FIG. 5A;

DESCRIPTION OF THE PREFERRED EMBODIMENT

Figure 3A:
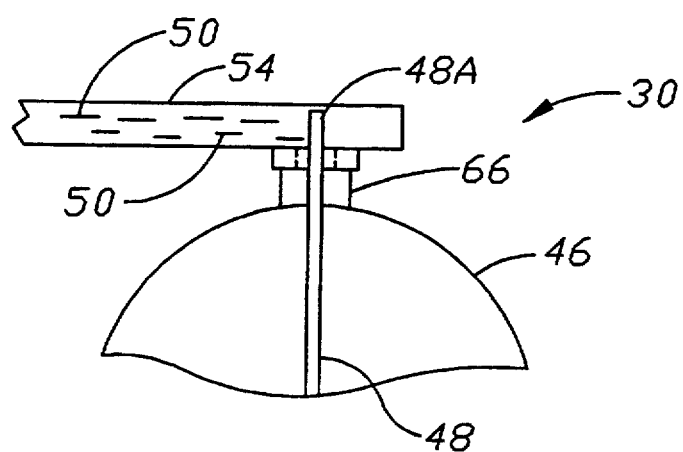
FIG. 3A is a partial schematic view of the top portion of the desiccant chamber including a portion of the waveguide.

Referring to FIG. 2, gas drying device 30 is shown in which wet gas 31 (illustrated by solid arrows) enters through wet gas inlet 32 and is introduced through channel 34 and screen 35 into gas drying chamber 36 containing desiccant material 38. The desiccant 38 contained in chamber 36 adsorbs moisture from the wet gas 31 in order to dry the wet gas. Dried gas 40 (illustrated by hollow arrows) exits the chamber 36 through screen 42 and is carried to dry gas outlet 44 at which dry gas 40 leaves the gas drying device 30. These gas drying devices 30 are commonly used to dry wet air, however, other gases can be similarly or analogously treated with use of these types of devices. In addition, the chambers that hold the desiccant often have gas under pressure introduced into the chamber in either the adsorption procedure and the regeneration procedure or both, however, the present invention would also be contemplated to work not only with chambers utilizing gas under pressure but also in ambient or nonpressurized environments.

As the one drying chamber 36 dries out wet gas 31, another chamber 46 of drying device 30 removes moisture adsorbed by desiccant 38 contained in the other chamber 46. Desiccant 38 of other chamber 46 was saturated with moisture when wet air was previously passed through other chamber 46 in an earlier gas drying cycle.

Disposed within both gas drying chambers 36 and 46 is an antenna member 48 which is in communication with microwaves 50 which are generated by microwave generator 52. Waveguide 54 is oriented with respect to microwave generator 52 to receive the microwaves so generated from generator 52 and carry them to a portion of the antenna member 48A disposed within the waveguide. The microwaves are carried along the length of the antenna 48 which has a portion 48A extending outside of the chamber 46 and disposed within waveguide 54. Antenna 48 extends through chamber 46 having portion 48B mounted or disposed outside of desiccant 38 and another portion 48C within the chamber immersed within the desiccant. The microwave energy is conducted by antenna 48 and travel along its length into the chamber 46 carrying the desiccant 38. The microwave energy carried into chamber 46 is adsorbed by the moisture held by the desiccant 38 which substantially reduces the time needed to remove the moisture adsorbed by the desiccant 38 within the chamber. Thus in the interest of maintaining a relative continuous dry air flow through dry gas outlet 44, one chamber 36 is drying wet gas 31 while the other chamber 46 is in the process of drying and regenerating desiccant 38 and vice versa.

Preferably the antenna 48 is a solid, rod shaped, elongated aluminum member. The aluminum antenna rod 48 has an outside surface which is substantially smooth to prevent arcing of the high frequency microwaves which are conducted by the aluminum antenna rod. However, it is contemplated that other shapes and configurations of antenna members may be used, as well as, various commonly known materials may be used in constructing the antenna member of the present invention.

As seen in FIGS. 2, 3B, 5B and 5C the shape of the chambers 36,46 are substantially cylindrical in shape with the antenna member 48 disposed substantially along the length of the cylindrical chambers. Extending antenna rod 48 substantially throughout the length of the chamber 48 enables the microwave energy so carried by the antenna to be dispersed substantially throughout the length of the chamber. The elongate antenna member 48 preferably is disposed and passes through a central portion of the chamber 46. The central positioning of the antenna member 48 ensures that the microwave energy so carried by the antenna rod is evenly distributed through the chamber body 46. Thus, the high frequency microwave energy is able to efficiently remove the moisture adsorbed by the desiccant 38 in the chamber during the desiccant drying regeneration cycle in the gas drying device 30.

Referring still to FIG. 2, as the dried gas 40 exits the gas drying chamber 36, a small percentage of the dry gas or purge gas 41 is diverted into a transport pipe 56 with the vast majority of the dry gas being removed from the device 30 through the dry gas outlet 44 for many various uses. This small diverted portion of the dried gas or purge gas 41 enters into inlet 58 and through screen 60 and into chamber 46 containing saturated desiccant 38. Moisture in saturated desiccant 38 is desorbed from desiccant 38 by dispersed microwave energy from antenna 48 by the adsorbed moisture in the desiccant absorbing the microwave energy and elevating the energy level of the moisture until the moisture releases from the desiccant. The dry purge gas 41 moving through the chamber 46 absorbs the released moisture and moves the moisture from the desiccant 38 and carries the absorbed moisture out of the chamber 46 through screen 62 and outlet 64. The present invention has dramatically dropped the amount of purge gas 41 needed to remove the desorbed moisture from desiccant chamber 46. In some demonstrations of use of the invention set forth below only 2 per cent of the exiting dry gas 40 was utilized for purge gas 41. Thus, a larger volume of dry gas 40 is available for use rather than for purge and further there is no need for the purge to be preheated prior to introduction into chamber 46 where the moisture in the desiccant is being heated by microwave energy.

Advantageously, the insertion of the antenna rod member 48 within the regenerating chamber 46 operating in conjunction with the microwave generator 52 and waveguide 54 provides for the use of a much smaller percentage of purge gas for drying and regenerating the moisture adsorbing desiccant than was required in known gas dry devices. Furthermore, the problems associated with known gas drying devices employing expensive, bulk and hazardous heating systems are avoided in the present invention.

Referring now to FIG. 3A, the top of the gas drying device 30 is shown with the waveguide 54 disposed outside of the cylindrical desiccant chamber 46. The antenna rod 48 is centrally positioned within the chamber 46 and having a top portion 48A of the antenna extending outside of the chamber in the waveguide 54 area. The microwave energy generated by the microwave generator 52, FIG. 2, communicates with the top portion 48A of the antenna member 48 in which top portion 48A is disposed within waveguide 54. The microwave energy which communicates with top antenna portion 48A is carried along the length of the antenna and is dispersed throughout the desiccant chamber 46. Waveguide 54 is connected to the chamber 46 at the top support member 66 of chamber 46. Antenna member 48 is supported through opening "O" at the top support member 66 of chamber 46. Top portion 48A of the antenna member 48 is enclosed by the waveguide 54 in order for the antenna to intercept microwave energy 50 transmitted within the waveguide 54. It is desirable that the waveguide 54 and chamber 46 are arranged, as seen in FIG. 3A, such that the microwaves within waveguide 54 do not leak out of the waveguide and thereby create a health hazard.

Figure 3B:
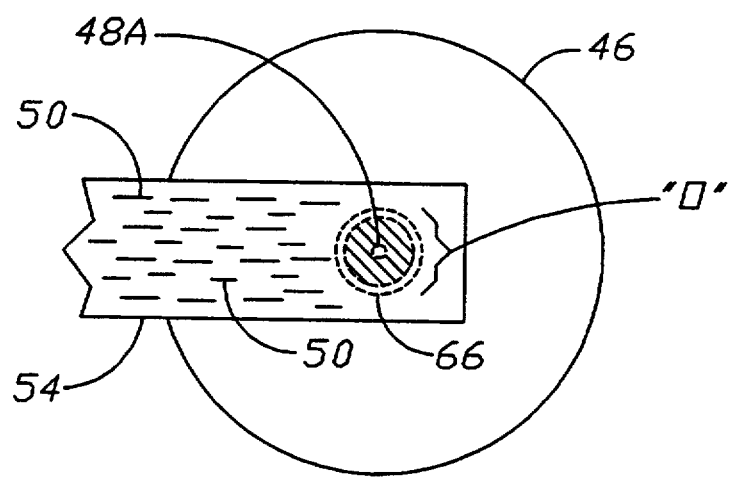
FIG. 3B is a top view of FIG. 3A.

Referring to FIG. 3B, the desiccant chamber 46 is shown from a top view as having a circular configuration along the width of the chamber which would provide a cross section of chamber 46 as substantially circular. Chamber 46 with this configuration is substantially cylindrical. The top portion 48A of the antenna member is positioned in alignment with a central location or approximately along the longitudinal axis of the cylindrical portion of the desiccant chamber 46. The top support member 66 stabilizes and maintains the antenna member 48 in the chamber 46 with top portion 48A extending into the waveguide 54 path. The microwaves transmitted throughout the waveguide are coupled with the top portion 48A of the antenna member for distribution in the desiccant chamber 46.

Figure 4A:
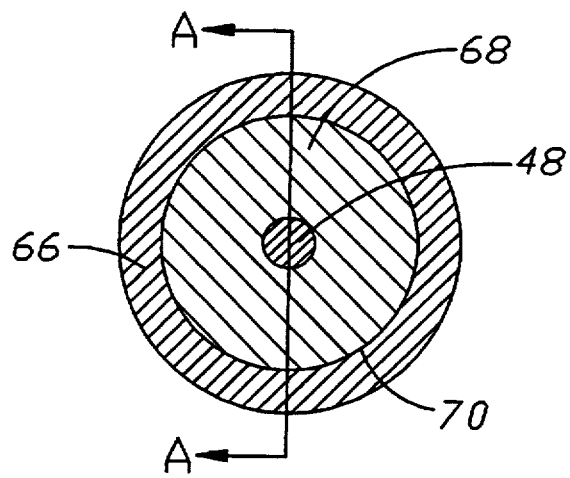
FIG. 4A is a cross section view of the outlet of the desiccant chamber designated as "O" in FIG. 3B.

Referring now to FIG. 4A, the top portion of elongate antenna rod 48 is secured within an opening "O" of the top support member 66 of the desiccant chamber 46. An insulative material 68 is disposed between the antenna member 48 and an inner wall 70 at the opening of the top support member 66 of the chamber 46. The insulative material 68 held within the inner wall 70 of the top support member 66 acts as an O-ring by engaging and supporting the antenna member 48 at the opening of the chamber 46. Preferably, the insulative material 68 is a TEFLON material to employ a tight and secure hold of the antenna rod 48 and to reduce the occurence of arcing with the chamber from the microwave energy. TEFLON is a trademark name for the chemical composition of polytetrafluoroethylene. Other well known excellent insulative materials that are substantially transparent to microwaves as Teflon can be used.

Figure 4B:
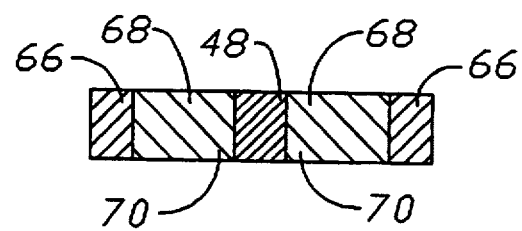
FIG. 4B is a cross section along A—A of FIG. 4A.

Referring to FIG. 4B, the cross sectional view of FIG. 4A illustrates the elongate antenna rod 48 supportably held by the O-ring or bushing of the insulative material 68. The tight fit of the antenna member 48 with the insulative TEFLON material 68 in conjunction with the secure positioning of the insulative material within the opening at the inner walls 70 of the chamber 46 enables the antenna member to be supported with the top portion 48A disposed within the waveguide 54, FIG. 3A and 3B, and the other portions 48B and 48C held within the chamber 46. The tight fit also maintains the desired pressures that can be introduced to chamber 46.

Figure 5A:
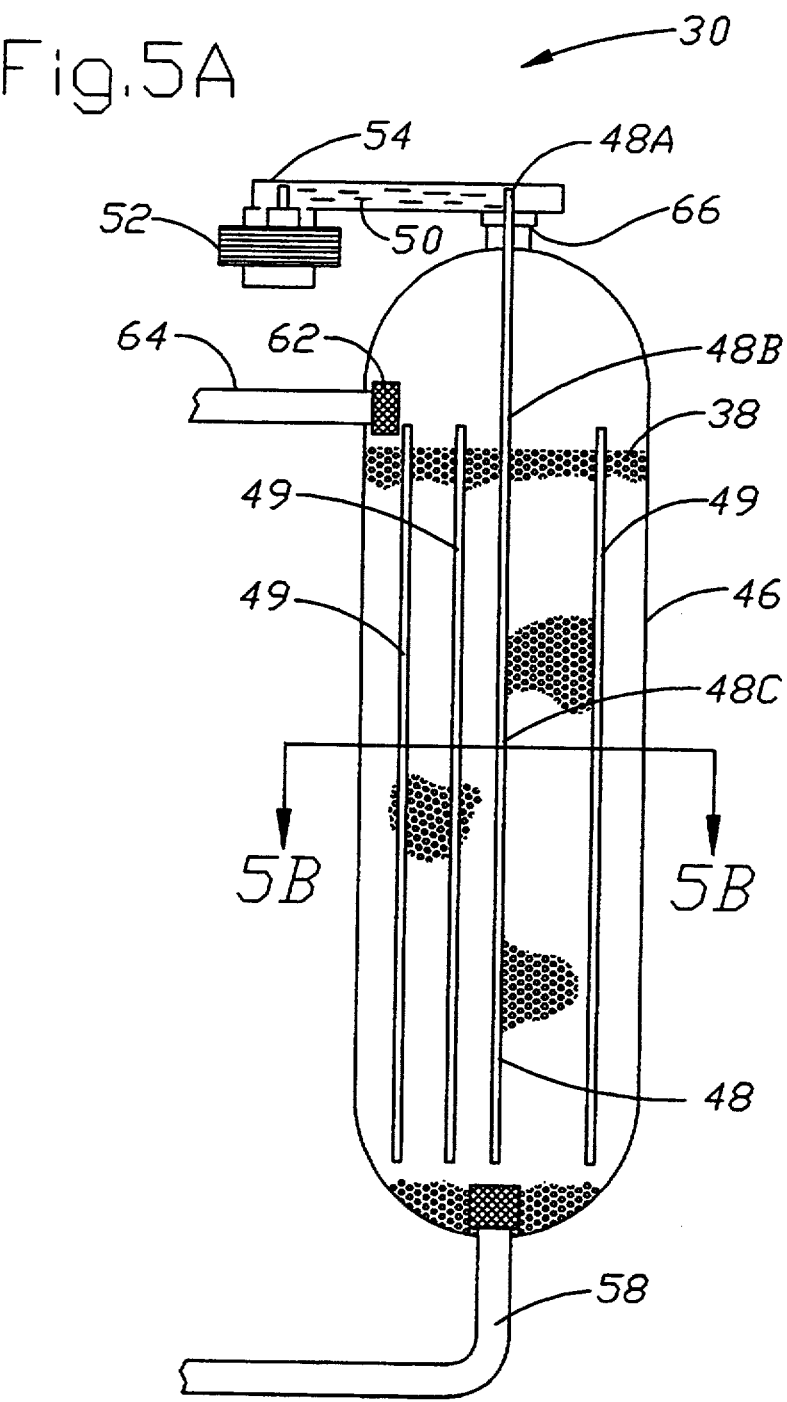
FIG. 5A is a partial schematic view of another embodiment of the gas drying device, as seen in FIG. 2.

Referring now to FIG. 5A, an alternative embodiment of the present invention shows the desiccant chamber 46 of the gas drying device 30 having three other antenna members 49 disposed within the chamber. Each of the other antenna members 49 is entirely disposed within the desiccant chamber 46. The other antenna members 49 are oriented in a position substantially parallel to the length of the centrally located antenna 48 and spaced from antenna 48 within the chamber 46. The other antennas 49 and the centrally located antenna 48 are all spaced from one another sufficiently to avoid arcing. The granules of the desiccant material 38 support the other elongate antenna rods 49 within the chambers. Preferably the other antenna rods 49 are of a similar configuration to that of the centrally located antenna rod 48. The other antenna members 49 are solid elongate, aluminum rods having a smooth outer surface to reduce arcing of the microwave energy so dispersed throughout the chamber 46. The distribution of the other antenna members 49 within the chamber 46 provides for accelerated and even dispersement of microwave energy throughout the chamber 46 thereby enabling increased efficiency in the removal of moisture adsorbed by the desiccant 38.

Referring to FIG. 5B, the cross sectional view of FIG. 5A illustrates the three other elongate antenna members 49 spaced apart from the centrally located antenna member 48. Preferably, the other antenna member 49 are equally spaced from the central antenna member 48 and each other to provide an even distribution of the microwave energy within the chamber 46 and as mentioned above at distances that will avoid arcing. The other antenna members 49 are preferably positioned in a parallel relationship with each other and with the length of the central antenna 48. The desiccant granules 38, as mentioned above, support each of the other elongate antenna members 49 within the chamber 46.

Referring to FIG. 5C, a further alternative embodiment of the present invention is shown in which six other antenna members 49 are equally spaced from each other and from the centrally located antenna member 48. Again, each of the six other antenna members 49 are oriented in a parallel relationship along their lengths with each other and parallel along the length of the central antenna member 48 within the chamber 46. The increase in the number of other antenna rods 49 within the chamber 46 coupled with the evenly spaced and parallel positioning of the other rods provides for rapid temperature increase throughout the chamber for quick and efficient removal of moisture from the desiccant 38 during regeneration of desiccant cycles within the chamber 46.

Figure 6B:
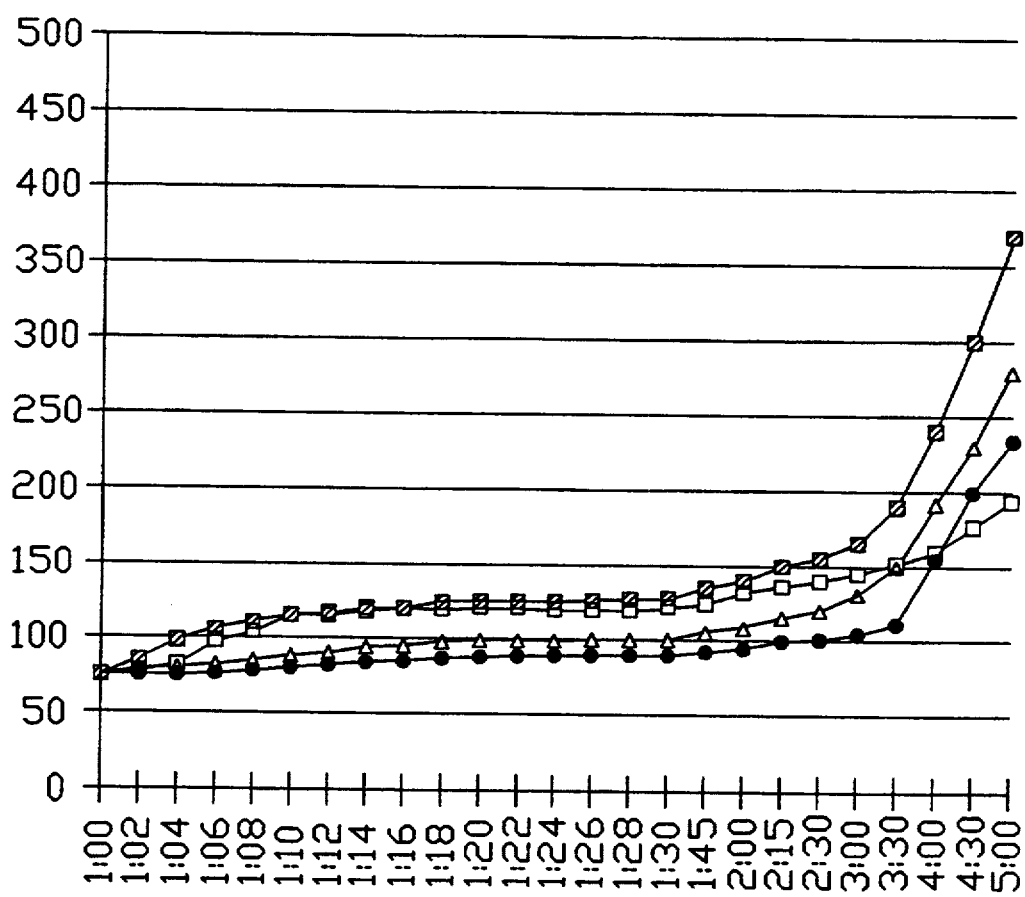
FIG. 6 is a table and graphic representation of the table for the performance of the gas drying device in which one antenna member is used, as seen in FIG. 2.
Figure 7B:
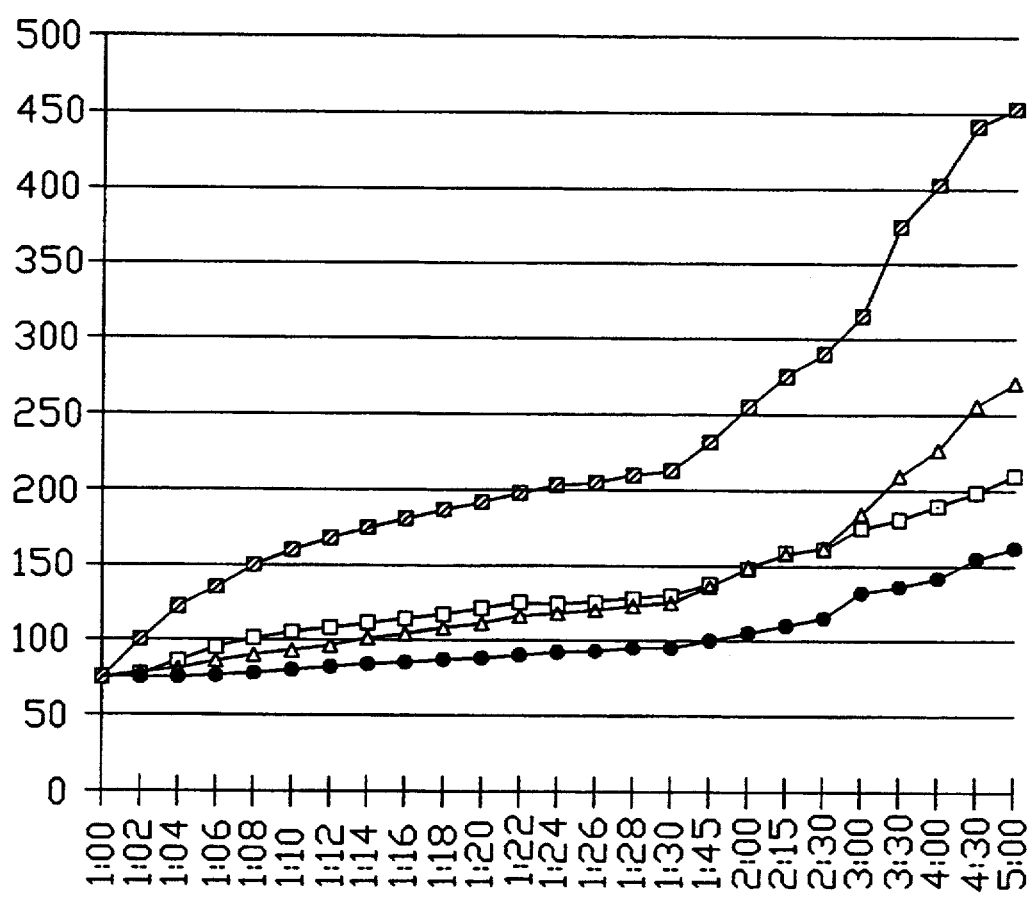
FIG. 7 is a table and graphic representation of the table for the performance of the gas drying device of the embodiment shown in FIG. 5A.

Referring now to FIGS. 6 and 7, these are charts and corresponding graphs of those charts for tests on the embodiment of the invention as shown in FIG. 2 and the embodiment of the invention as shown in FIG. 5A respectively. The test for each embodiment utilized a chamber holding approximately 50 pounds of activated alumina as desiccant in which 7 pounds of water was introduced to the desiccant. The microwave generator was 600 watts. The interior diameter of the chamber was 8 inches. This drying device was comparable to an 80 cubic feet per minute unit which utilized only approximately 1.5 cubic feet per minute purge gas which equated to slightly less than a 2 per cent demand for purge.

Thus, FIG. 6 is a test on the present invention where there was only one centrally located antenna member 48 disposed in chamber 46. Antenna member 48 for this test was a ⅜ inch in diameter solid aluminum rod. The microwave generator 52 was initiated with the desiccant at approximately room temperature of 75 degrees Fahrenheit. As time progressed, through a period of 5 minutes, temperature readings were periodically taken in the dessicant at the top portion, middle portion and bottom portion in chamber 46. Temperature readings were also taken at these times of the discharge at outlet 64. The chart and corresponding graph reflect the temperatures at the different locations at specific times subsequent to the commencing of the microwave generator.

The same test parameters were set for the test portrayed in FIG. 7 except in addition to the centrally located antenna member 48 there were three other antenna members 49 in the configuration shown in FIGS. 5A and 5B. The three other antenna members 49 were suspended in the desiccant and were also ⅜ inch in diameter solid aluminum rods. As can be seen in comparing the values between FIGS. 6 and 7, there was a dramatic increase in the temperatures of each of the locations of the top, middle, bottom and discharge locations in the embodiment of FIG. 7. Thus, the rate of heating was faster with the addition of the other antenna members 49 thereby accelerating the release of the adsorbed moisture.

While the advantages of the invention are preferably obtained with the gas drying device 30 described above with reference to FIGS. 2-7, the method of the invention can be practiced with any other gas drying devices for drying wet gas introduced into a chamber containing desiccant in which the desiccant adsorbs moisture from the wet gas in drying the wet gas and microwave energy is applied to the adsorbed moisture to remove moisture from the desiccant to regenerate the desiccant for reuse in drying wet gas. The preferred method of practicing the invention comprises the steps of (1) placing an antenna member into communication with microwaves generated by a microwave generator, and (2) disposing at least a portion of the antenna member into a chamber containing desiccant.

Referring to FIG. 2, the method of drying wet gas 31 is done in the gas drying device 30 by orienting a waveguide 54 relative to the microwave generator 52 for receiving microwaves 50 from the generator 52. A portion 48A of the antenna member 48 is disposed within the waveguide 54. The method includes the step of enclosing the entire portion 48A of the antenna members 48 within the waveguide 54. Another portion 48B of the antenna member 48 is disposed within the chamber 46 with portion 48C inserted into the desiccant 38 contained in the chamber 46.

Referring to FIGS. 5A-5C, the method of the present invention is preferably performed by the step of disposing at least one other antenna member 49 in the desiccant chamber 46 which is spaced away from and parallel to the centrally located antenna member 48. Additionally, the other antenna members 49 are completely disposed within the chamber 46 and are held in position by the desiccant 38. The other antenna members 49 are placed in the chamber with at least two of the three other antenna members 49 being spaced at a distance substantially equal to a third other antenna member 49. Each of the other antenna members 49 are equally spaced and oriented parallel to each other and the centrally positioned antenna member 48. The preferred positioning is to place centrally located antenna member 48 and evenly space other antenna members 49 from centrally located antenna member 48 and substantially parallel to the same. This general approach will enhance distribution of the microwave energy.

I claim:

1. A method for drying wet gas in which wet gas is introduced into a chamber having an interior wall with a bottom interior wall portion defining a bottom chamber portion and a top interior wall portion defining a top chamber portion in which the bottom chamber portion contains desiccant, whereby the desiccant adsorbs moisture from the wet gas in drying the wet gas and subsequently microwave energy is introduced into the chamber and purge gas is introduced into the bottom chamber portion to remove moisture from the desiccant and to regenerate the desiccant for reuse in drying wet gas, comprising the steps of:

placing an antenna member having a top antenna end and a bottom antenna end into communication with microwaves generated by a microwave generator; and disposing the bottom antenna end into the chamber and into the desiccant contained in said chamber and in which the bottom antenna end is spaced apart from the bottom interior wall portion of the chamber defining the bottom chamber portion and containing the desiccant from which the purge gas is introduced.

2. The method of drying wet gas of claim 1 includes the step of orienting a waveguide relative to the microwave generator for receiving microwaves from the microwave generator.

3. The method of drying wet gas of claim 1 includes the step of disposing a portion of the antenna member within the waveguide.

4. The method of drying wet gas of claim 3 in which the step of disposing a portion of the antenna within the waveguide includes the step of enclosing substantially the entire the portion of the antenna member within the waveguide.

5. The method of drying wet gas of claim 1 includes the step of diposing at least one other antenna member in the chamber and spaced from the antenna member.

6. The method of drying wet gas of claim 5 includes the step of placing at least two other antenna members in the chamber and spaced substantially equal distance from the antenna member.

7. The method of drying wet gas of claim 5 includes the step of placing at least one other antenna member substantially parallel to the antenna member.

8. The method of drying wet gas of claim 5 in which the step of disposing at least one other antenna member in the chamber includes the step of disposing the at least one other antenna member completely within the chamber.

9. The method of drying wet gas of claim 5 includes the step of disposing at least a portion of the at least one other antenna members into the desiccant.

10. The method of drying wet gas of claim 5 includes the step of disposing at least three other antenna members within the chamber in which two of the at least three other antenna members are spaced substantially equal distance to a third other antenna member of the at least three other antenna members.

11. The method of drying wet gas of claim 10 in which the at least the three other antenna members within the chamber are spaced from the antenna member and each other and are oriented substantially parallel to the antenna member and each other.

12. The method of drying wet gas of claim 1 includes the step of introducing a purge gas into the chamber through an inlet in the chamber to move moisture released from the desiccant out of the chamber through an outlet in the chamber.

13. In a gas drying device in which wet gas is introduced into a chamber having an interior wall with a bottom interior wall portion defining a bottom chamber portion and a top interior wall portion defining a top chamber portion in which only the bottom chamber portion contains desiccant, whereby the desiccant adsorbs moisture from the wet gas to dry the wet gas and in which purge gas is subsequently introduced into the bottom chamber portion to remove the adsorbed moisture from the desiccant to regenerate the desiccant for reuse to dry wet gas, the improvement comprises:
 a microwave generator; and
 an antenna member having a top antenna end and a bottom antenna end and in which the antenna member is in communication with microwaves generated by the microwave generator with the bottom antenna end disposed within the chamber and in communication with the desiccant located therein and in which the bottom antenna end is spaced apart from the bottom interior wall portion of the chamber defining the bottom chamber portion and containing said desiccant from which the purge gas is introduced.

14. The gas drying device of claim 13 which includes a waveguide oriented with respect to the microwave generator to receive microwaves generated by the microwave generator.

15. The gas drying device of claim 14 in which a portion of the antenna member is disposed within the waveguide.

16. The gas drying device of claim 14 in which the waveguide is disposed outside of the chamber.

17. The gas drying chamber of claim 16 in which a portion of the antenna member is disposed outside of the chamber has at least a part of the portion disposed within the waveguide.

18. The gas drying device of claim 14 in which the waveguide is connected to the chamber and substantially encloses a portion of the antenna member which is disposed outside of the chamber.

19. The gas drying device of claim 13 in which the antenna member is secured to the chamber at an opening in said chamber.

20. The gas drying device of claim 19 in which an insulative material is disposed between the antenna member and a wall of the chamber at said opening.

21. The gas drying device of claim 20 in which the insulative material is TEFLON.

22. The gas drying device of claim 20 in which the insulative material is in the form of a bushing which engages the antenna member and the wall of the chamber at said opening.

23. The gas drying device of claim 13 in which the antenna member is composed of aluminum.

24. The gas drying device of claim 13 in which the antenna member is in the shape of a rod.

25. The gas drying device of claim 13 in which the antenna member is solid.

26. The gas drying device of claim 13 in which the antenna member has an outside surface which is substantially smooth.

27. The gas drying device of claim 13 in which the chamber is elongated.

28. The gas drying device of claim 13 in which the chamber has a length and the antenna member is disposed substantially along the length of the chamber.

29. The gas drying chamber of claim 13 in which the chamber has a cross section in which the antenna member passes through a central portion of the cross section of the chamber.

30. The gas drying device of claim 13 in which said chamber has at least a portion which is substantially cylindrical and a corresponding cross section which is substantially circular.

31. The gas drying device of claim 19 in which the antenna member extends substantially along the length of the cylindrical shape and through the central portion of the corresponding circular cross section.

32. The gas drying device of claim 30 in which the at least one other antenna member is oriented substantially parallel to the antenna member within the chamber.

33. The gas drying device of claim 13 in which at least one other antenna member is disposed within the chamber.

34. The gas drying device of claim 33 in which the at least one other antenna member is entirely disposed within the chamber.

35. The gas drying device of claim 33 in which the at least one other antenna member is spaced apart from the antenna member within the chamber.

36. The gas drying device of claim 33 in which the at least one other antenna member includes at least two other antenna members in which the at least two of the other antenna members are substantially equally spaced from the antenna member.

37. The gas drying device of claim 33 in which the at least one other antenna member includes at least two other antenna members in which the at least two of the other antenna members are substantially parallel to each other and the antenna member and spaced apart from each other.

38. The gas drying device of claim 33 in which the at least one other antenna member includes at least three other antenna members in which the at least three other antenna members are spaced from the antenna member and from each other and in which two of the three other antenna members are substantially equally spaced from a third other antenna member.

39. The gas drying device of claim 13 in which the chamber has an outlet and an inlet in which a purge gas is introduced into the chamber through the inlet to move moisture released from the desiccant out of the chamber through the outlet.

* * * * *